Nov. 16, 1948.  J. JANDASEK  2,453,795
FLUID TORQUE CONVERTER, INCLUDING MULTIPLE
ENERGIZING AND ENERGY ABSORBING ELEMENTS
Filed Oct. 11, 1943

INVENTOR.
Joseph Jandasek.
BY
A. E. Wilson
ATTORNEY.

Patented Nov. 16, 1948

2,453,795

UNITED STATES PATENT OFFICE 2,453,795

FLUID TORQUE CONVERTER, INCLUDING MULTIPLE ENERGIZING AND ENERGY ABSORBING ELEMENTS

Joseph Jandasek, Highland Park, Mich., assignor to Bendix Aviation Corporation, South Bend, Ind., a corporation of Delaware Application October 11, 1943, Serial No. 505,806

9 Claims. (Cl. 60—54)

This invention relates to transmissions and more particularly to fluid transmissions having multiple fluid energizing and energy absorbing members.

An object of this invention resides in the provision of a fluid transmission having a plurality of successively operable fluid energizing and energy absorbing members whereby the power transmitting characteristics of the device may be automatically varied in accordance with variations of the power being transmitted.

A further object of the invention resides in the provision of a fluid transmission having separately operable entrance and discharge impeller, turbine and guide wheel members wherein both units of each class may be successively operated dependent on the power transmitting requirements to which the device is subjected.

A further object of the invention is to provide a fluid transmission having spaced discharge impeller turbine and guide wheel members adapted to operate when low torque is being transmitted, and spaced entrance impeller turbine and guide wheel members adapted to automatically function when the torque transmitting requirements are such as to overload the discharge impeller, turbine and guide wheel members.

Yet another object of the invention resides in the provision of a transmission having a power transmitting fluid circuit composed of multistage impeller turbine and guide wheel members capable of successively operating to efficiently transmit wide variations of power.

Another object of the invention is to provide a fluid transmission having auxiliary entrance impeller turbine and guide wheel members adapted to rotate with main discharge impeller turbine and guide wheel members in the formation of a power transmitting fluid circuit, wherein the auxiliary members are controlled by speed responsive means to permit the transmission of greater power.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views.

Figure 1:
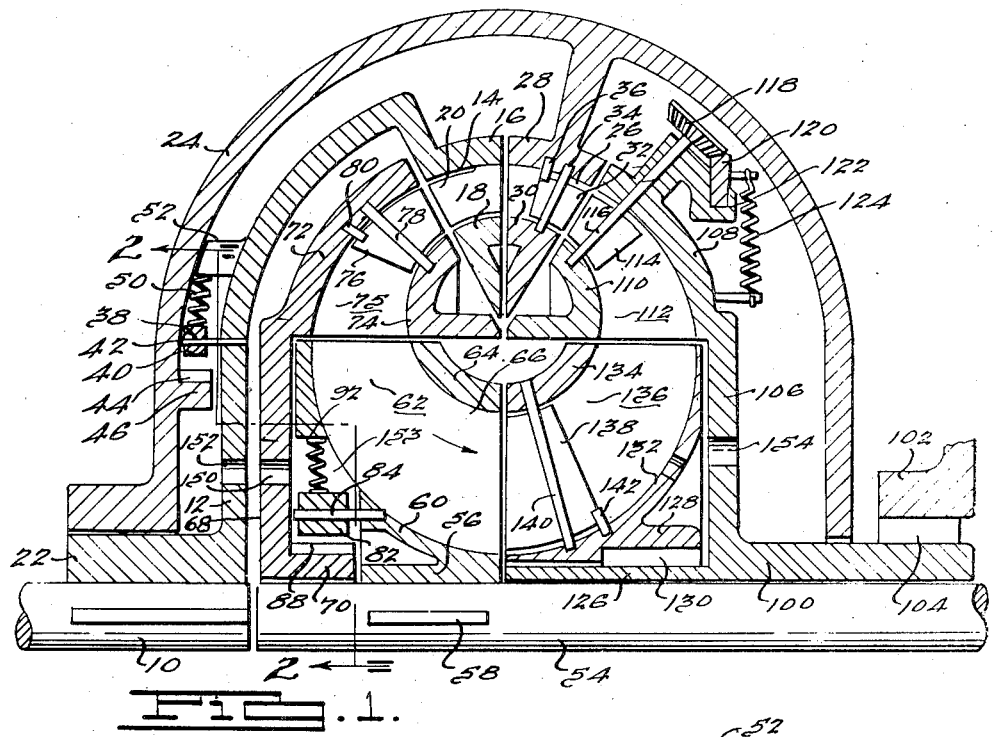
Fig. 1 is a longitudinal sectional view illustrating one desirable form of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a driving shaft 10 has thereon a radially extended web 12 supporting a discharge impeller channel 14 interposed between a web 16 and a shroud 18. Fluid deflecting vanes 20 are supported in the channel between the web 16 and the shroud 18 and each vane has a flexible end portion as illustrated to yieldingly deflect power transmitting fluid.

The radially extending flange 12 has an axially extended hub 22 for the reception of the driving shaft 10. A housing 24 rotatably mounted on the hub 22 carries an entrance impeller channel 26 interposed between a web 28 and a shroud 30.

Semi-free vanes 32 are mounted in the entrance of the impeller channel 26 on shafts 34 journaled in a web and a shroud 28 and 30 respectively, and stops 36 preferably on the web 28 are provided to limit the angular movement of the vanes 32. The vanes 32 are thus controlled as to angularity to deflect the power transmitting fluid through the impeller channel to impart energy thereto from the driving shaft 10 under certain conditions of operation.

A one-way driving means interposed between the housing 24 and the radially extended flange 12 connects the entrance impeller member 26 carried by the housing 24 to rotate with the flange 12 and discharge impeller member 14 when the discharge impeller 14 attains a predetermined speed.

Any suitable locking means may be employed to lock the housing 24 to rotate with the flange 12, such for example as a pawl and ratchet one-way driving mechanism 38. The one-way driving mechanism 38 comprises pawls 40 mounted on pins 42 carried by the radially extended flange 12. The dogs of the pawls 40 are adapted to engage the teeth 44 of a ratchet member 46 carried by the housing 24.

The pawls 40 are provided with weights 48 subjected to centrifugal force as the radially extended flange 12 rotates to drive the discharge impeller. The centrifugal force exerted on the weights 48 is opposed by springs 50 interposed between the pawls 40 and supports 52 carried by the flange 12. It will be apparent that when the speed of rotation of the driving shaft 10 and radially extended flange 12 increases to a predetermined point the centrifugal force exerted on the weights 48 moves the dogs of the pawls 40 into engagement with the teeth 44 of the ratchet 46 to connect the housing 24 to rotate with the radially extended flange 12 to drive the entrance impeller member.

A driven shaft 54 aligned with the driving shaft 10 has thereon a discharge turbine hub 56 secured against displacement as by a key 58. The turbine hub 56 supports a web 60 having secured thereon suitable energy absorbing turbine vanes 62. The turbine vanes are also secured to a turbine shroud 64 to form a discharge turbine channel 66 between the web and shroud.

An auxiliary turbine channel may be interposed between the discharge impeller channel 14 and the discharge turbine channel 66. A radially extended flange 68 has a hub 70 rotatably mounted on the driven shaft adjacent the turbine hub 56. The radially extended flange 68 carries spaced web and shroud 72 and 74 respectively defining therebetween an auxiliary turbine channel 75. Semi-free energy absorbing vanes 76 are mounted in the channel on shafts 78 journaled in the web and shroud and stops 80 on the web 72 are provided to limit the angular movement of the vanes 78.

Speed responsive one-way driving means may be interposed between the web 60 of the turbine hub 56 and the inwardly extended flange 70 of the entrance turbine carrying flange 68.

Figures 2, 3:
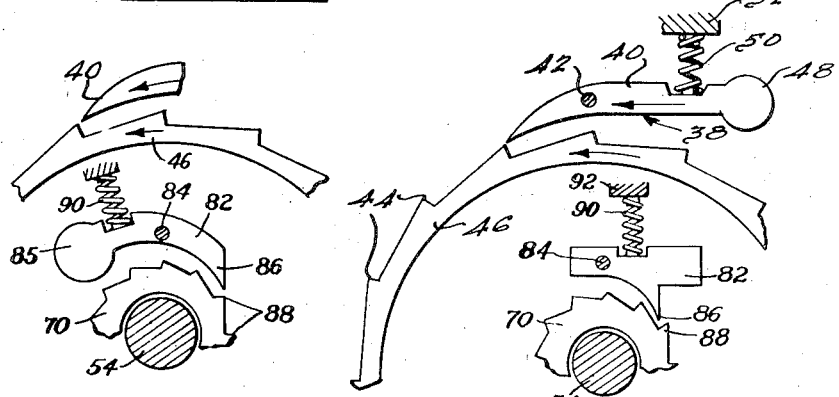
Fig. 2 is a sectional view taken substantially on the line 2—2 of Fig. 1 looking in the direction of the arrows.
Fig. 3 is a view similar to Fig. 2 showing a modified form of the invention.

One suitable form of such one-way driving means is shown in Fig. 2 and comprises pawls 82 mounted on pins 84 carried by the web 60, the dogs 86 of which are adapted to engage a ratchet 88 on the hub 70. A spring 90 interposed between the pawl 82 and a portion 92 of the discharge turbine member may be provided to yieldingly urge the pawl 82 into engagement with the ratchet 88 in opposition to centrifugal force exerted on the pawl 82.

At slow speed operation the springs 90 retain the dogs 86 of the pawls 82 in engagement with the ratchet 88 to maintain the entrance turbine operative to absorb energy and impart it to shaft 54 during slow speed operation of the device. When the speed of rotation of the discharge turbine increases to such a point that the centrifugal force exerted on the weight of the pawl 82 overcomes the force of the spring 90 the pawls 82 oscillate in the counter-clockwise direction around the pins 84 to release the entrance turbine, whereupon power is transmitted by the discharge turbine only at high speeds of operation.

In the embodiment illustrated in Fig. 3 a weight 85 carried by the pawl 82 on the opposite side of the pivot 84 from the dogs 86 is provided to render the entrance turbine operative to impart energy to shaft 54 only at higher speeds of rotation. Where this embodiment is employed, centrifugal force exerted on the weight 85 opposes and overcomes the force of the spring 90 to effect engagement of dogs 86 with ratchet 88 and augment the energy absorbing characteristics of the discharge turbine by adding the energy absorbing characteristics of the entrance turbine thereto at higher speeds.

A discharge guide wheel is interposed between the turbine and the impeller to deflect the power transmitting fluid so that power may be transferred from the driving shaft 10 to the driven shaft 54 with torque multiplication. A guide wheel hub 100 is mounted for rotation on the driven shaft 54 in spaced relation to a stationary member 102 and a one-way brake 104 is interposed between the hub and stationary member so that the guide wheel hub may freely rotate in one direction when the device is operating as a fluid clutch, but is restrained from rotation in the opposite direction when the device is operating as a torque converter.

The guide wheel hub 100 has a radial flange 106 terminating in spaced web and shroud members 108 and 110 defining therebetween a discharge guide wheel channel 112. Suitable fluid deflecting blades 114 are fixed to shafts 116 journaled in the web and shroud members 108 and 110 respectively. The shafts 116 are provided with gears 118 meshing with a ring gear 120 rotatably mounted on a portion 122 of the web member 108. A spring 124 interposed between the ring gear 120 and the web 108 may be provided to yieldingly urge the vanes 114 to a predetermined position.

An entrance guide wheel may be interposed between the discharge turbine channel 66 and the discharge guide wheel channel 112. The guide wheel hub 100 has an axially extended sleeve 126 which receives the entrance guide wheel hub 128 with a one-way brake means 130 interposed.

The entrance guide wheel hub 128 is provided with spaced web and shroud members 132 and 134 defining therebetween an entrance guide wheel channel 136. Semi-free guide wheel vanes 138 are mounted on pivots 140 journaled in the web and shroud 132 and 134 respectively and stop members 142 on the web 132 limit angular movement of the vanes 138.

The entrance and discharge impeller, turbine and guide wheel members cooperate to form a power transmitting fluid circuit wherein energy from the driving shaft 10 may be imparted to the fluid in the entrance and discharge impeller channels 26 and 14 respectively and absorbed from the circulating fluid in the entrance and discharge turbine channels 75 and 62 respectively.

The flow of fluid may be deviated and rectified in the entrance and discharge guide wheel channels 136 and 112 respectively to change the direction of fluid flow to permit the transmission of power from the driving shaft 10 to the driven shaft 54 with torque multiplication.

The flange 68 carrying the entrance turbine member and the flange 12 carrying the discharge impeller are provided with spaced apertures 150 and 152 respectively preferably aligned with an aperture 153 in the turbine web 60 to permit predetermined quantities of power transmitting fluid to flow therethrough to subject opposite sides of the flanges 68 and 12 to substantially equal pressures thereby substantially eliminating axial thrust on these members. The flange 106 carrying the discharge guide wheel may similarly be provided with spaced apertures 154 to permit the flow of predetermined quantities of fluid therethrough to substantially balance pressures on opposite sides of the flange 106. If desired the apertures 150, 152 and 154 may be proportioned to subject their associated flanges to substantially predetermined axial pressures. It will be apparent that suitable sealing means may be interposed between opposite ends of the rotatable housing 24 and the impeller and guide wheel hubs 22 and 100 respectively.

The operation of this device is as follows: When low torque is being transmitted from the driving shaft 10 to the driven shaft 54 power applied to the driving shaft 10 is effective through the flange 12 to energize fluid in the discharge impeller channel 14. While this impeller channel is illustrated as being of the substantially axial flow type it will be apparent that any type impeller member may be employed such for example as the radial flow or any other type.

Power transmitting fluid issuing from the discharge impeller channel 14 passes freely through the entrance turbine channel 75 and impinges on the vane 62 of the discharge turbine channel 66 whereupon energy is absorbed from the fluid to drive the driven shaft 54.

The fluid emanating from the discharge turbine channel 66 flows through the entrance guide wheel channel 136 freely and enters the discharge guide wheel channel 112 where its direction of flow is deviated by engagement with the guide wheel vanes 114 yieldingly urged toward a predetermined position by the spring 124. The fluid emanating from the discharge guide wheel channel 112 flows into the entrance impeller channel 26 and discharge impeller channel 14 at an appropriate angle to permit the transmission of power with torque multiplication.

Upon an increase in the speed of rotation of the driving shaft 10, the one-way driving means 38 is actuated to connect the entrance impeller to the discharge impeller to impart additional energy to the power transmitting fluid. Similarly the one-way driving means 82 between the entrance and discharge turbines is effective at low driven shaft speeds only when the Fig. 2 locking means is employed and at high driven shaft speeds only when the Fig. 3 locking means is employed to connect the entrance turbine to the discharge turbine whereupon greater energy may be absorbed from the power transmitting fluid to increase the power transmitting characteristics of the device.

It will be noted that the discharge guide wheel member 112 is locked against rotation in the reverse direction by means of the one-way brake 104 interposed between the guide wheel hub 100 and the stationary member 102. When the operating characteristics are such that additional guidance of the fluid is required to transmit power at increased torque, the one-way braking means 130 interposed between the entrance guide wheel member and the sleeve 126 of the guide wheel hub 100 is effective to induce operation of the entrance guide wheel member 136 whereupon power may be transmitted with higher torque multiplication.

If the load to which the driven shaft 54 is subjected decreases, or the power applied to the driving shaft 10 increases to such a point that torque multiplication is unnecessary, the one-way brake means 104 between the discharge guide wheel and the stationary member 102, and the one-way brake means 130 between the entrance guide wheel member 136 and the discharge guide wheel member 112 are released whereupon the entrance and discharge guide wheel members may rotate freely in the forward direction to permit the transmission of power from the driving shaft 10 to the driven shaft 54 with no torque multiplication to operate the device as a fluid clutch.

It will be apparent that I have provided a fluid transmission having a plurality of successively operable impellers, turbines and guide wheels whereby power may be economically transmitted with minimum losses since only a sufficient number of fluid energizing or energy absorbing and deflecting members are operated as may be required to carry the load being transmitted. The entrance and discharge guide wheels need not begin to function simultaneously since the discharge guide wheel may be rendered operative to transmit power where low torque multiplication only is required, and the entrance guide wheel may thereafter be rendered operative where additional torque multiplication is required.

This is a continuation in part of my copending application Serial Number 310,786, filed December 23, 1939, and now abandoned.

I claim:

1. In a fluid transmission, a driving shaft, a primary impeller fixed to the driving shaft, a secondary impeller, one-way driving means for coupling the primary and secondary impellers, a driven shaft, a primary turbine fixed to the driven shaft, a secondary turbine, one-way driving means for coupling the primary and secondary turbines, a primary guide wheel associated with the driven shaft, a secondary guide wheel, one-way driving means for coupling the primary and secondary guide wheels, a stationary member, and one-way driving means for coupling the primary guide wheel and said stationary member.

2. A fluid transmission comprising a driving shaft, a plurality of successively operable impellers associated therewith, a driven shaft, a plurality of successively operable turbines associated therewith, a stationary member, a plurality of successively operable guide wheels cooperating with the impeller and turbine members to form a power transmitting fluid circuit, and one-way braking means between the guide wheels and at least one of the guide wheels and the stationary member.

3. A fluid transmission comprising a driving shaft, a discharge impeller carried by the shaft, a driven shaft, a discharge turbine member carried by the driven shaft, a stationary member, a discharge guide wheel on the stationary member, one-way braking means between the discharge guide wheel and the stationary member, a driving shaft speed responsive entrance impeller and a driven shaft speed responsive turbine adapted to be connected respectively to the discharge impeller and to the discharge turbine to cooperate therewith in the transmission of high torque, an entrance guide wheel member, and one-way braking means between the entrance and discharge guide wheels whereby the entrance guide wheel member becomes effective when high torque multiplication is required.

4. A fluid transmission comprising driving and driven shafts, a multi-section impeller carried by the driving shaft, a multi-section turbine carried by the driven shaft, driving means responsive to the speed of the driving shaft for coupling the sections of the impeller, driving means responsive to the speed of the driven shaft for coupling the sections of the turbine, a stationary member, a guide wheel, and one-way brake means between the stationary member and the guide wheel.

5. A fluid transmission comprising driving and driven shafts, a multi-section impeller carried by the driving shaft, a multi-section turbine carried by the driven shaft, driving shaft speed responsive driving means for coupling the sections of the impeller, driven shaft speed responsive means for coupling the turbine sections, a stationary member, a multi-section guide wheel, means for coupling the guide wheel sections, and one-way brake means between the stationary member and the guide wheel.

6. A fluid transmission comprising a driving shaft, a discharge impeller carried by the driving shaft, a rotatable housing enclosing the discharge impeller, an entrance impeller carried by the rotatable housing, driving shaft speed responsive driving means for coupling the discharge and entrance impellers, a driven shaft, a discharge turbine carried by the driven shaft, an entrance turbine, driven shaft speed responsive driving means for coupling the discharge and entrance turbines, a stationary member, a discharge guide wheel, one-way braking means between the discharge guide wheel and the stationary member, an entrance guide wheel, and one-way brake means between the discharge guide wheel and the entrance guide wheel.

7. A fluid transmission comprising a drive shaft, a primary impeller thereon, a secondary impeller, drive shaft speed responsive means for coupling the impellers, a driven shaft, a primary turbine thereon, a secondary turbine, driven shaft speed responsive means for coupling the turbines, a stationary member, a primary guide wheel thereon, a one-way brake between the stationary member and the guide wheel, a secondary guide wheel, and automatically operative means for coupling the guide wheels.

8. A fluid transmission comprising a driving shaft, a primary impeller secured thereto, a secondary impeller, means for coupling the impellers responsive to increased drive shaft speed, a driven shaft, a primary turbine thereon, a secondary turbine, means for coupling the turbines responsive to increased driven shaft speed, a stationary member, a primary guide wheel thereon, means inhibiting rotation of the guide wheel in one direction, a secondary guide wheel, and automatically operative means for coupling the guide wheels.

9. A fluid transmission comprising primary and secondary impellers, turbines and guide wheels cooperating with one another to provide a fluid power transmitting circuit, means for coupling the impellers effective only upon increased speed of rotation of the primary impeller, means for coupling the turbines effective only upon increased speed of rotation of the primary turbine, a stationary member, a guide wheel rotatable thereon, means for holding the guide wheel against rotation in one direction, a secondary guide wheel, and automatically operative means for coupling the guide wheels.

JOSEPH JANDASEK.

REFERENCES CITED

The following references are of record in the file of this patent:

UNITED STATES PATENTS

| Number | Name | Date |
|---|---|---|
| 1,583,735 | Nydqvist | May 4, 1926 |
| 1,583,736 | Nydqvist | May 4, 1926 |
| 1,627,294 | Nydqvist | May 3, 1927 |
| 1,760,480 | Coats | May 27, 1930 |
| 2,222,618 | Jandasek | Nov. 26, 1940 |
| 2,271,919 | Jandasek | Feb. 3, 1942 |

FOREIGN PATENTS

| Number | Country | Date |
|---|---|---|
| 420,252 | Great Britain | Nov. 28, 1934 |